United States Patent
Alfano et al.

(10) Patent No.: US 7,747,244 B2
(45) Date of Patent: *Jun. 29, 2010

(54) METHODS AND APPARATUS FOR RE-ESTABLISHING COMMUNICATION FOR A WIRELESS COMMUNICATION DEVICE AFTER A COMMUNICATION LOSS IN A WIRELESS COMMUNICATION NETWORK

(75) Inventors: Nicholas P. Alfano, Vancouver (CA); Noushad Naqvi, Waterloo (CA); Sarmad K. Musa, Mississauga (CA); Bryan Taylor, Kitchener (CA); Craig A. Dunk, Guelph (CA); Atul Asthana, Unionville (CA); Adrian Buckley, Tracy, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 598 days.

This patent is subject to a terminal disclaimer.

(21) Appl. No.: 11/622,397

(22) Filed: Jan. 11, 2007

(65) Prior Publication Data

US 2007/0178888 A1    Aug. 2, 2007

Related U.S. Application Data

(63) Continuation of application No. 10/762,957, filed on Jan. 22, 2004, now Pat. No. 7,181,204.

(30) Foreign Application Priority Data

Jan. 23, 2003    (WO) .................... PCT/CA03/00092

(51) Int. Cl.
 *H04W 24/00* (2009.01)
(52) U.S. Cl. ............... 455/414.1; 455/414.2; 455/422.1
(58) Field of Classification Search ...... 455/421–435.3, 455/456.1–458; 379/3.1–3.7, 635
 See application file for complete search history.

(56) References Cited

U.S. PATENT DOCUMENTS 5,280,541 A    1/1994    Marko et al.

(Continued)

FOREIGN PATENT DOCUMENTS

EP    0871340 A2    10/1998

(Continued)

OTHER PUBLICATIONS

International Search Report for PCT Application # PCT/CA03/00092, Date Jan. 19, 2004.
Written Opinion for PCT Application # PCT/CA03/00092, Date Dec. 29, 2004.

(Continued)

*Primary Examiner*—Kent Chang
*Assistant Examiner*—Kashif Siddiqui
(74) *Attorney, Agent, or Firm*—John J. Oskorep, Esq.

(57) ABSTRACT

Several related methods and apparatus for re-establishing communication for a wireless communication device after a communication loss between the wireless device and a wireless communication network are disclosed. In one illustrative example, the wireless network broadcasts identifiers of wireless devices associated with communication losses in the wireless network over a control channel. After regaining signal coverage, a wireless device monitors the control channel to decode and compare each broadcasted identifier with an identifier of the wireless device. Based on a match between a broadcasted identifier and the identifier of the wireless device, the wireless device transmits a control message which informs the wireless network of the presence of the wireless device. Otherwise, the wireless device normally refrains from transmitting the control message to the wireless network. Advantageously, communication with the wireless network is re-established (if at all necessary) without overburdening the wireless link with unnecessary traffic.

13 Claims, 11 Drawing Sheets

U.S. PATENT DOCUMENTS

| | | | |
|---|---|---|---|
| 5,454,026 | A | 9/1995 | Tanaka |
| 5,727,002 | A | 3/1998 | Miller et al. |
| 5,748,100 | A | 5/1998 | Gutman et al. |
| 5,970,063 | A | 10/1999 | Chapman et al. |
| 6,223,037 | B1 | 4/2001 | Parkkila |
| 6,275,680 | B1 * | 8/2001 | Martin et al. ............... 340/7.45 |
| 6,320,852 | B1 | 11/2001 | Obuchi et al. |
| 6,381,455 | B1 * | 4/2002 | Smolik ....................... 455/421 |
| 6,999,729 | B2 | 2/2006 | Wandel |
| 7,046,646 | B2 * | 5/2006 | Kilgore ....................... 370/331 |
| 7,373,145 | B2 | 5/2008 | Wandel |
| 2001/0034228 | A1 * | 10/2001 | Lehtovirta et al. .......... 455/424 |
| 2002/0082018 | A1 | 6/2002 | Coskun et al. |
| 2002/0101880 | A1 | 8/2002 | Kim et al. |
| 2002/0159546 | A1 | 10/2002 | Fulghum et al. |
| 2004/0058679 | A1 | 3/2004 | Dillinger et al. |
| 2004/0148092 | A1 | 7/2004 | Kim et al. |
| 2004/0214573 | A1 | 10/2004 | Bamburak et al. |
| 2004/0233870 | A1 | 11/2004 | Willenger et al. |

FOREIGN PATENT DOCUMENTS

| | | |
|---|---|---|
| EP | 0871340 A3 | 10/1998 |
| EP | 1227639 A2 | 7/2002 |
| EP | 1227639 A3 | 7/2002 |
| WO | 9512931 A1 | 5/1995 |
| WO | 0137473 A1 | 5/2001 |
| WO | WO 01/47142 A1 | 6/2001 |
| WO | 0150637 A1 | 7/2001 |
| WO | 03043258 A1 | 5/2003 |
| WO | 2005002148 A1 | 1/2005 |

OTHER PUBLICATIONS

International Preliminary Examination Report for PCT Application # PCT/CA03/00092, Date Apr. 22, 2005.

Ayanoglu, Ender; "Airmail: A link-layer protocol for wireless networks": Feb. 1995; pp. 1-33, Baltzer Science Publishers; Amsterdam, NL.

PCT International Preliminary Examamination Report for Application #PCT/CA02/01472, Jan. 7, 2003.

* cited by examiner

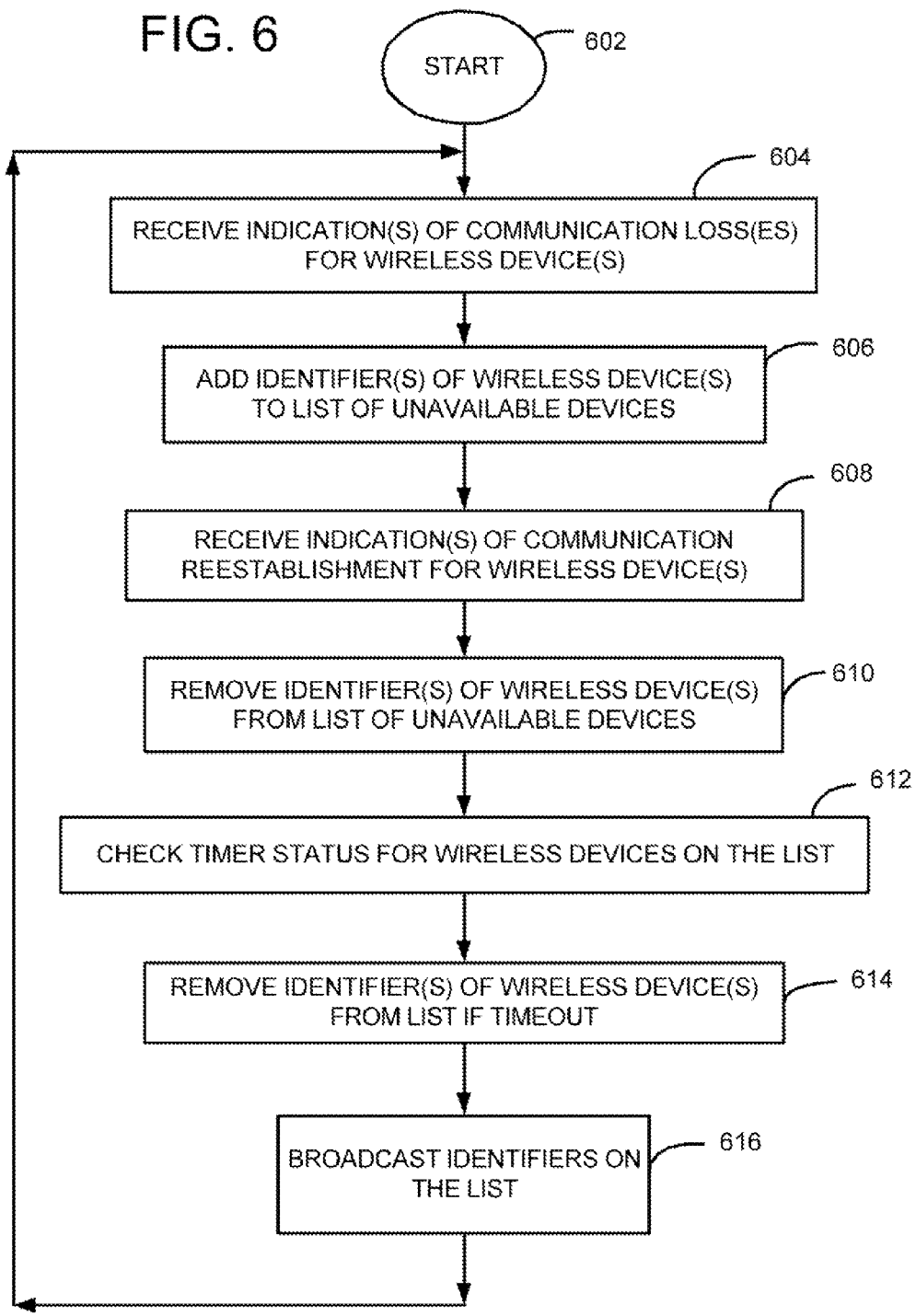

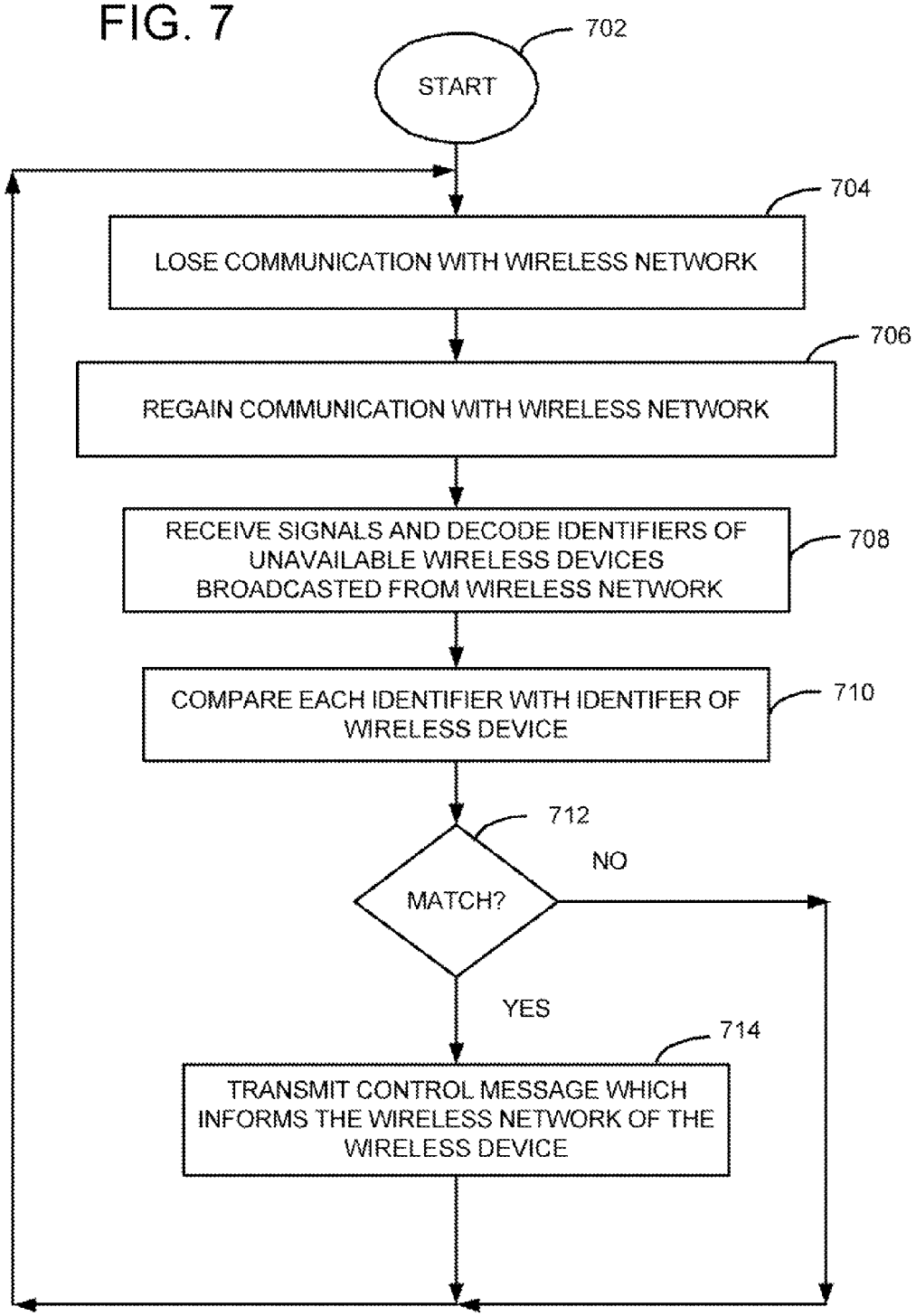

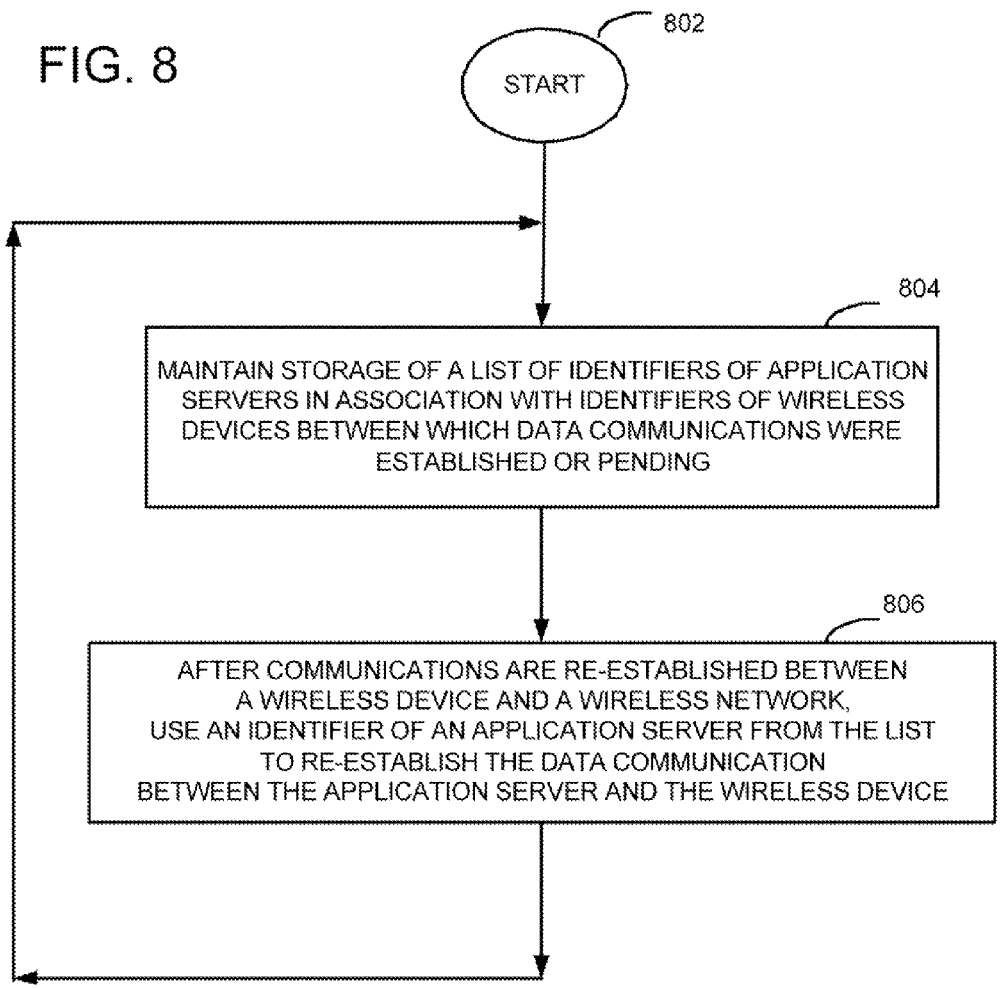

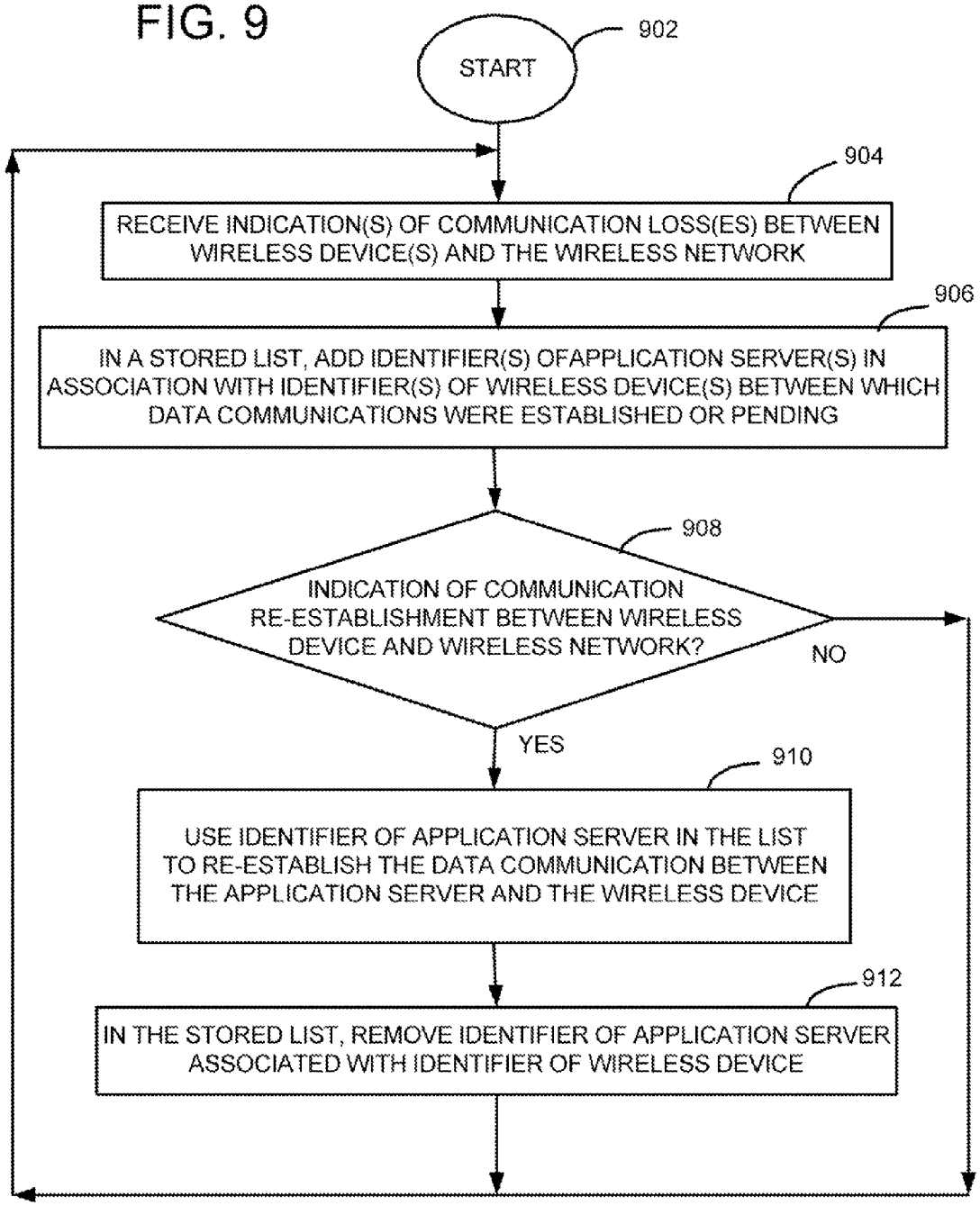

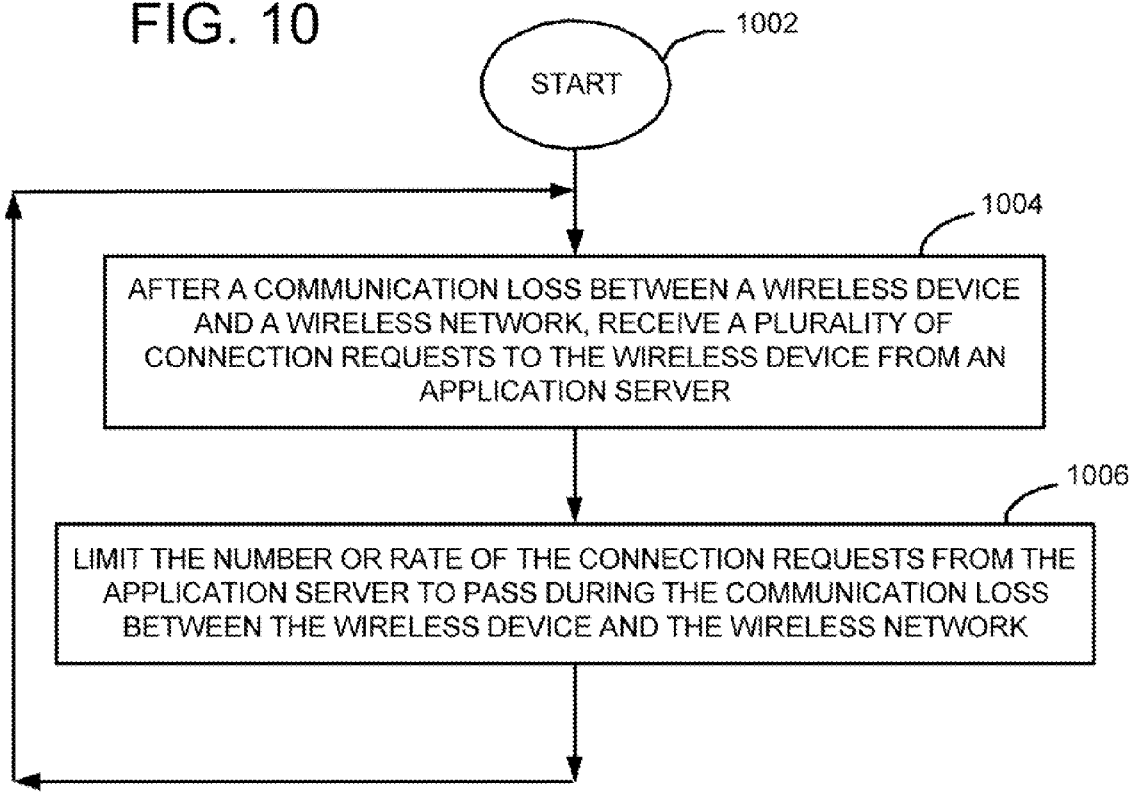

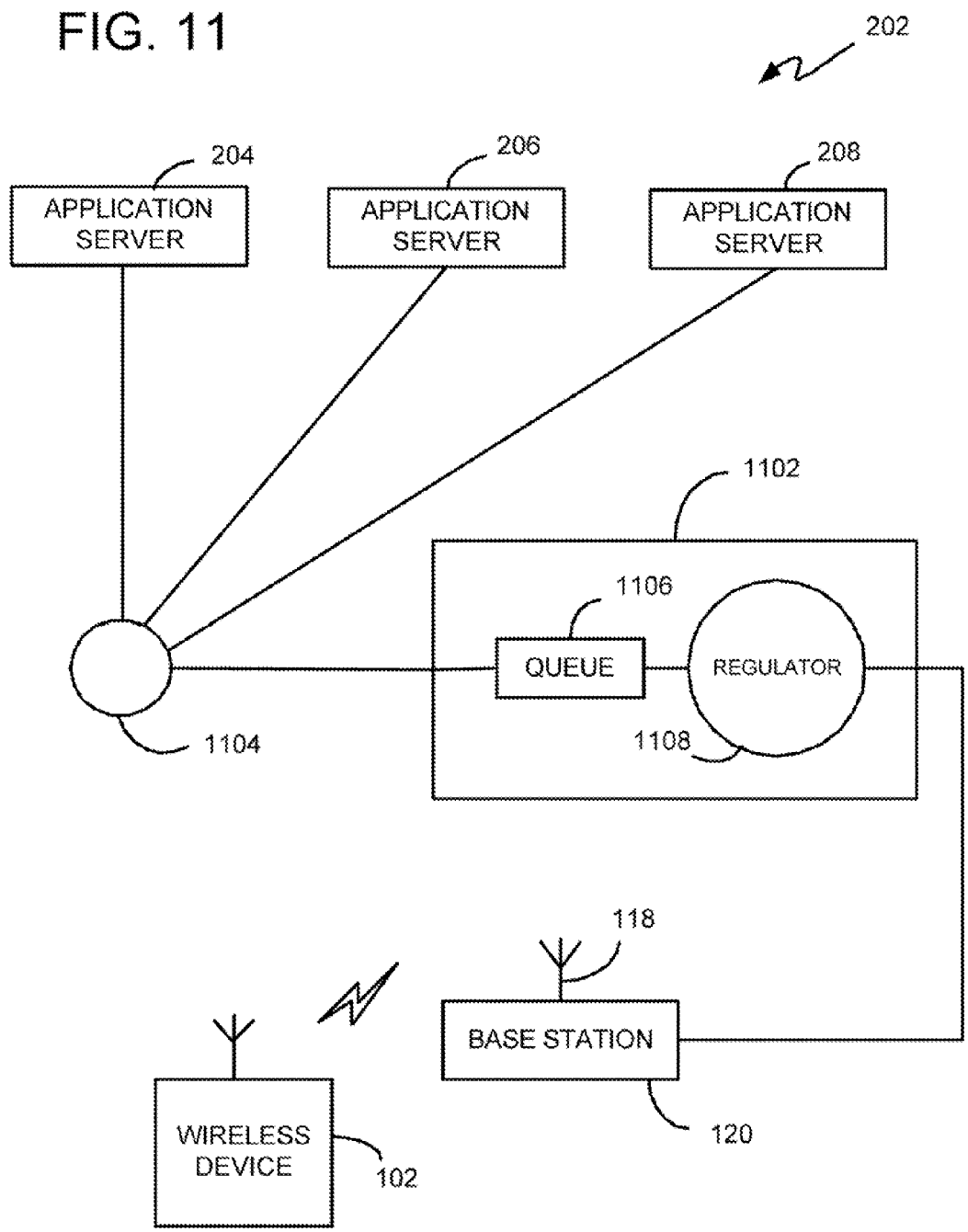

METHODS AND APPARATUS FOR RE-ESTABLISHING COMMUNICATION FOR A WIRELESS COMMUNICATION DEVICE AFTER A COMMUNICATION LOSS IN A WIRELESS COMMUNICATION NETWORK

CROSS-REFERENCE TO RELATED APPLICATION

This patent application is a continuation of and claims priority to U.S. patent application having Ser. No. 10/762,957, filing date of Jan. 22, 2004 now U.S. Pat. No. 7,181,204, and title of "METHODS AND APPARATUS FOR RE-ESTABLISHING COMMUNICATION FOR A WIRELESS COMMUNICATION DEVICE AFTER A COMMUNICATION LOSS IN A WIRELESS COMMUNICATION NETWORK," which in turn claims the benefit of International Application No. PCT/CA03/00092 filed on Jan. 23, 2003, each of which is hereby incorporated by reference herein.

BACKGROUND

1. Field of the Technology

The present application relates generally to data communication for wireless communication devices, and more particularly to methods and apparatus for re-establishing communication for a wireless communication device after a communication loss in a wireless communication network.

2. Description of the Related Art

Wireless communication devices, when operating within poor coverage areas of a wireless communication network such as a wireless packet-switched network, may only be able to send and receive traffic during sporadic intervals. This causes conventional notions of packet-switched data transactions to break down. Conventional approaches, such as simply retrying transmission using a back-off algorithm, will result in either an intensive use of radio resources or poor reliability, especially for communication in a direction from the network to the wireless device.

Many known wireless networks exploit the notion of a wireless device querying data from a server, as typically employed in most Internet transactions. This includes, for example, requests for web pages and periods polling of an e-mail server for new e-mail by an e-mail program. In this conventional "pull" approach, the typical traffic pattern is the wireless device sending to the network followed by the network sending a response to the wireless device. When the network is sending to the wireless device, it is always doing so a short time after the quality of the link has been established. If the transaction fails due to poor coverage, the wireless device or user may wait for coverage to improve and subsequently retry the query. However, the onus is on the wireless device to retry the transaction after any such communication problems.

An alternate communication scheme uses a "push" methodology. "Push" refers to data being pushed to the wireless device from the network. The conventional Internet notion or periodic polling for new data (such as e-mail messages) is undesirable as it is thought to be too radio resource intensive for a wireless device application. As an alternative, push requires that an exchange of traffic be initiated from the network side. Many packet-switched wireless networks have provisions for network-initiated traffic.

In one known push approach, the network will attempt to contact a wireless device several times either by sending a packet directly or paging the wireless device. This approach works well for a small number of retries, but if a large number of devices have pending traffic, the network's ability to contact devices may be quickly exhausted without exchanging any useful traffic. To limit wasting radio resources attempting to contact wireless devices, a typical network will only attempt to contact a wireless device a limited number of times and subsequently stop trying until the device makes itself known to the network again. Thus, the wireless devices may indicate to the network that they have regained coverage after a period being out of coverage. Such an indication informs the network that it may send to the wireless device again, even if the network has previously stopped trying to contact the wireless device. A fundamental problem with the approach is that the wireless device may not know whether its coverage is in fact adequate without testing the network's ability to receive communication signals transmitted by the wireless device. However, testing how well the network receives communication signals from the wireless device can only reliably be determined by actually sending packets to the network. This uses radio resources and is thus not done very often.

Some networks, such as General Packet Radio Service (GPRS) based network, force a wireless device to periodically indicate to the network that it is in fact available on the network. Again, however, this uses radio resources and is therefore performed at relatively long intervals, typically on the order of an hour. While this periodic transmission will get the network and wireless device's view of coverage in sync, the network's view of coverage may be very different from the wireless device's view between these periodic transmissions to the network.

Further issues arise in connection with the use of one or more application servers (e.g. an e-mail server) which provide voice and/or data services to the wireless devices. For one, an application server will lose its connection with a wireless device after a communication loss between the wireless device and the wireless network, (e.g. out of coverage situation. If the data connection is not automatically re-established once the wireless device regains adequate signal coverage, the wireless device may not adequately receive continued service(s) from the application server. If the application server is configured to automatically re-establish the connection with the wireless device once broken, however, it may undesirably flood the network with connection requests to the wireless device while it is still unavailable.

Accordingly, there is a resulting need for improved methods and apparatus for re-establishing communication for a wireless communication device after a communication loss in a wireless communication network.

SUMMARY

Several methods and apparatus for re-establishing communication for a wireless communication device after a loss of communication between the wireless device and a wireless communication network are disclosed.

In one illustrative technique, the wireless network broadcasts identifiers of wireless devices associated with communication losses in the wireless network over a control channel. After remaining coverage, a wireless device monitors the control channel to decode and compare each broadcasted identifier with an identifier of the wireless device. Based on a match between a broadcasted identifier and the identifier of the wireless device, the wireless device transmits a control message which informs the wireless network of the presence of the wireless device. Otherwise, the wireless device normally refrains from transmitting any control message to the wireless network. Thus, the wireless network can make a determination of whether the wireless device is out of coverage and control the re-establishment process, in such a manner that does not overburden the wireless link with unnecessary traffic.

In another illustrative technique a communication loss between the wireless device and the wireless network occurs sometime after a connection between an application server and the wireless device is established. Once communication is re-established between the wireless device and the wireless network, a stored association of identifiers for the application server and the wireless device is used to assist in automatically re-establishing a connection between the wireless device and the application server. For example, the application server may be automatically contacted using its stored identifier to re-establish a connection once communication is re-established between the wireless device and the wireless network.

In yet another illustrative technique, a plurality of connection requests from an application server to the wireless device are received at a network server after a communication loss between the wireless device and the wireless network. However, a number or a rate of the connection requests from the application server is limited by the network server during the communication loss. The number or rate of connection requests may be limited by using, for example, a rate limiting or a traffic policing technique.

Advantageously, communication for the wireless device is re-established without overburdening the wireless network and/or wireless link using such methods and apparatus described herein. Other aspects and features will become apparent to those ordinarily skilled in the art upon review of following description of specific embodiments in conjunction with the accompanying figures.

BRIEF DESCRIPTION OF THE DRAWINGS

Embodiments of present invention will now be described by way of example with reference to attached figures, wherein:

FIGS. 6 and 7 are related flowcharts for describing another method of re-establishing communication for a wireless communication device;

FIGS. 8 and 9 are related flowcharts for describing a method of re-establishing communication for a wireless communication device with one or more application servers.

FIG. 10 is a flowchart for describing another method of re-establishing communication for a wireless communication device with one or more application servers; and FIG. 11 is an illustration of a network server used in a network for the method described in relation to FIG. 10.

DETAILED DESCRIPTION OF THE PREFERRED EMBODIMENTS

In the present application, FIGS. 1-4 show various perspectives and levels of detail of different network and device configurations which may be utilized in connection with several different methods and apparatus described in relation to FIGS. 5-11.

Figure 1:
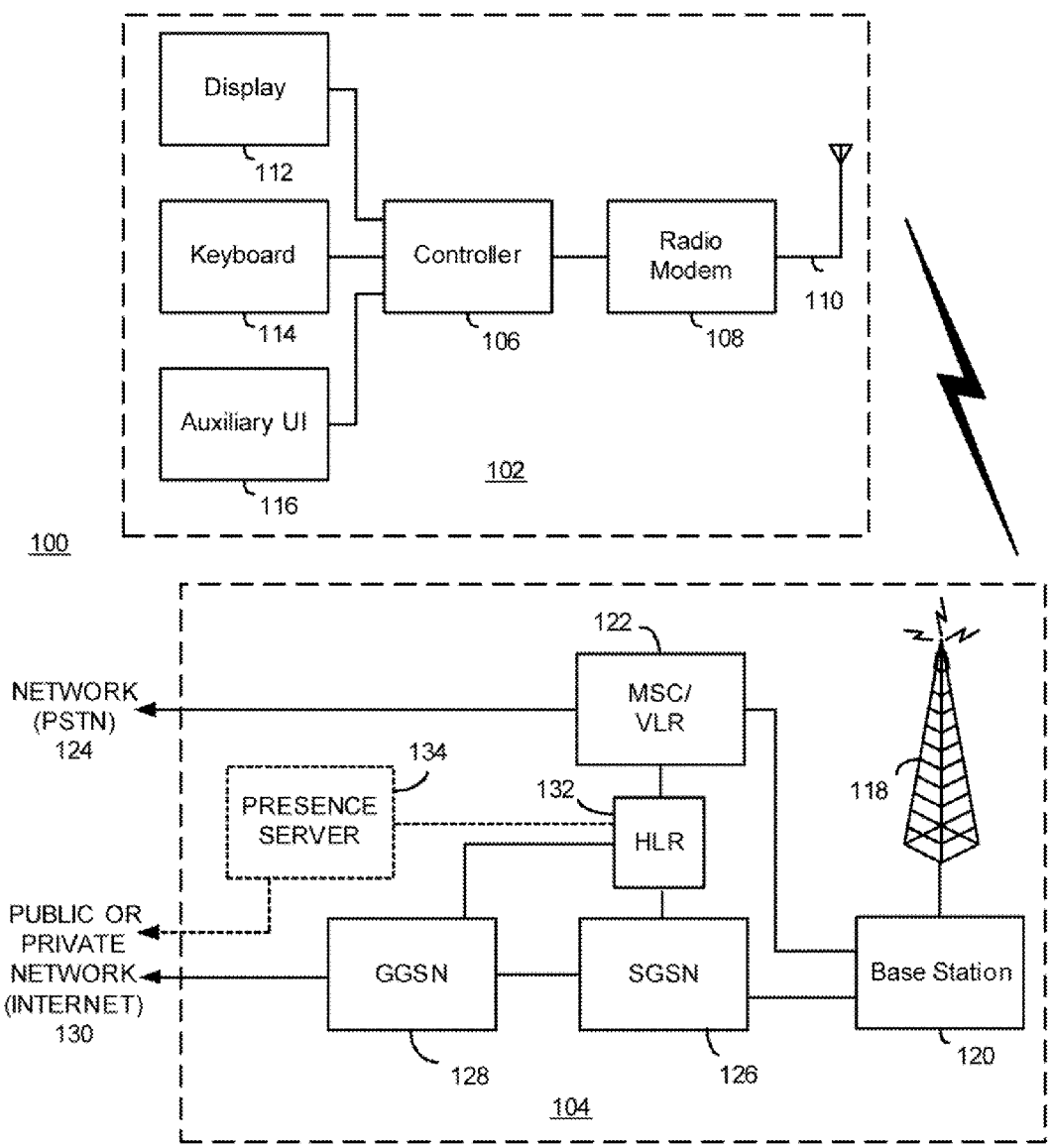
FIG. 1 is a block diagram of a communication system which includes a wireless communication device for communicating in a wireless communication network.

More particularly, FIG. 1 is a block diagram of a communication system 100 which includes a wireless communication device 102 which communicates in a wireless communication network 104. Wireless communication device 102 preferably includes a display 112, a keyboard 114, and perhaps one or more auxiliary user interfaces (UI) 116, each of which are coupled to a controller 106. Controller 106 is coupled to a radio modem 108 and an antenna 110.

In most modern communication devices, controller 106 is embodied as a central processing unit (CPU) which runs operating system software in a memory compartment (not shown). Controller 106 will normally control overall operation of wireless device 102, whereas signal processing operations associated with communication functions are typically performed in radio modem 108. Controller 106 interfaces with device display 112 to display received information, stored information, user inputs, and the like. Keyboard 114, which may be a telephone type keypad in full alphanumeric keyboard, is normally provided for entering data for storage in wireless device 102, information for transmission to network 104, a telephone number to place a telephone call, commands to be executed on wireless device 102, and possibly other or different user inputs.

Wireless device 102 sends communication signals to and receives communication signals from network 104 over a wireless link via antenna 110. Radio modem 108 performs functions similar to those of base station 120, including for example modulation/demodulation and possibly encoding/decoding and encryption/decryption. It is also contemplated that modem 108 may perform certain functions in addition to those performed by base station 120. It will be apparent to those skilled in art that radio modem 108 will be adapted to particular wireless network or networks in which wireless device 102 is intended to operate.

In wireless device 102, a transmitter within radio modem 108 is typically keyed or turned on only when it is sending to network, and is otherwise turned off to conserve resources. Such intermittent operation of transmitter has a dramatic effect on power consumption of wireless device 102. Since power to wireless device 102 is normally provided by a limited power source, such as a rechargeable battery, device design and operation must minimize power consumption in order to extend battery life or time between power source charging operations.

As apparent from the above, the term "wireless device" is used herein in reference to a wireless mobile communication device. In the embodiment of FIG. 1, wireless device 102 is a mobile station. Wireless device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, wireless device 102 may be a multiple-module unit comprising a plurality of separate components, including but in no way limited to a computer or other device connected to a wireless modem. In particular, for example, in the wireless device block diagram of FIG. 1, modem 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to an effectively assume control of radio modem 108 and antenna 110 of a single-unit device such as one of those described above. Although only a single wireless device 102 is shown in FIG. 1, it will be apparent to those skilled in art to which this application pertains that many devices, including different types of devices, may be active or operable within a wireless communication network at any time. In addition, such a wireless device 102 may have a more particular implementation is described later in relation to wireless device 402 of FIG. 4.

Wireless device 102 communicates in and through wireless communication network 104. In the embodiment of FIG. 1, wireless network 104 is a Global Systems for Mobile (GSM) and General Packet Radio Service (GPRS) network. Wireless network 104 includes a base station 120 with an associated antenna tower 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to base station 120 and to a landline network, such as a Public Switched Telephone Network (PSTN) 124. SGSN 126 is coupled to base station 120 and no GGSN 128, which is in turn coupled to a public or private data network 130 (such as the Internet). HLR 132 is coupled to MSC 122, SCSN 126, and GGSN 128.

Base station 120, including its associated controller and antenna tower 118, provides wireless network coverage for a particular coverage area commonly referred to as a "cell". Base station 120 transmits communication signals to an receives communication signals from wireless devices within its cell via antenna tower 118. Base station 120 normally performs such functions as modulation and possibly encoding and/or encryption of signals to be transmitted to the wireless device in accordance with particular, usually predetermined, communication protocols and parameters, under control of its controller. Base station 120 similarly demodulates and possibly decodes and decrypts, if necessary, any communication signals received from wireless device 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels and associated protocols used between wireless network 104 and wireless device 102. A radio frequency (RF) channel is a limited resource that must be conserved, typically due to limits in overall bandwidth and a limited battery power of wireless device 102. Although a network is normally adapted to be continuously or intermittently keyed, even where no traffic is exchanged, a wireless device is typically only keyed when it has traffic to send. Conventional "pull" approaches involving a query from a device to a network before meaningful information is exchanged is resource intensive, and in many circumstances unsuitable for wireless network 104.

Those skilled in art will appreciate that a wireless network in actual practice may include hundreds of cells, each served by a distinct base station 120 and transceiver, depending upon desired overall expanse of network coverage. All base station controllers and base stations may be connected by multiple switches and routers (not shown), controlled by multiple network controllers.

For all wireless device's 102 registered with a network operator, permanent data (such as wireless device 102 user's profile) as well as temporary data (such as wireless device's 102 current location) are stored in HLR 132. In case of a voice call to wireless device 102, HLR 132 is queried to determine the current location of wireless device 102. A Visitor Location Register (VLR) of MSC 122 is responsible for a group of location areas and stores the data of those wireless devices that are currently in its area of responsibility. This includes parts of the permanent wireless device data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Being part of the GPRS network, Serving GPRS Support Node (SGSN) 126 is at the same hierarchical level as MSC 122 and keeps track of the individual locations of wireless devices. SGSN 126 also performs security functions and access control. Gateway GPRS support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by wireless device 102 or by base station 120 instructing wireless device 102 to select a particular cell. Wireless device 102 informs wireless network 104 when it reselects another cell or group of cells, known as a routing area.

In order to access GPRS services, wireless device 102 first makes its presence known to wireless network 104 by performing what is known as a GPRS "attach". This operation establishes a logical link between wireless device 102 and SGSN 126 and makes wireless device 102 available to receive, for example, pages via SGSN, notifications of incoming GPRS data, or Short Message Service (SMS) messages over GPRS. In order to send and receive GPRS data, wireless device 102 assists in activating the packet data address that it wants to use. This operation makes wireless device 102 known as GGSN 128; interworking with external data networks can thereafter commence. User data may be transferred transparently between wireless device 102 and the external data networks using, for example, encapsulation and tunneling. Data packets are equipped with GPRS-specific protocol information and transferred between wireless device 102 and GGSN 128.

As apparent from the above, the term "wireless network" includes those fixed network components used to facilitate the wireless transfer of information, and includes but is not limited to RF transceivers, amplifiers, base station controllers, network servers, servers connected to the network, etc. Those skilled in art will appreciate that a wireless network may be configured to interact with and involve other systems and components, including other network components and networks (e.g. the Internet) not explicitly shown in FIG. 1. Which parts of a network (or networks) are responsible for which particular aspects of the final behaviour at the wireless link is not as important as the overall behaviour that connected components produce, except where explicitly noted herein.

Figure 2:
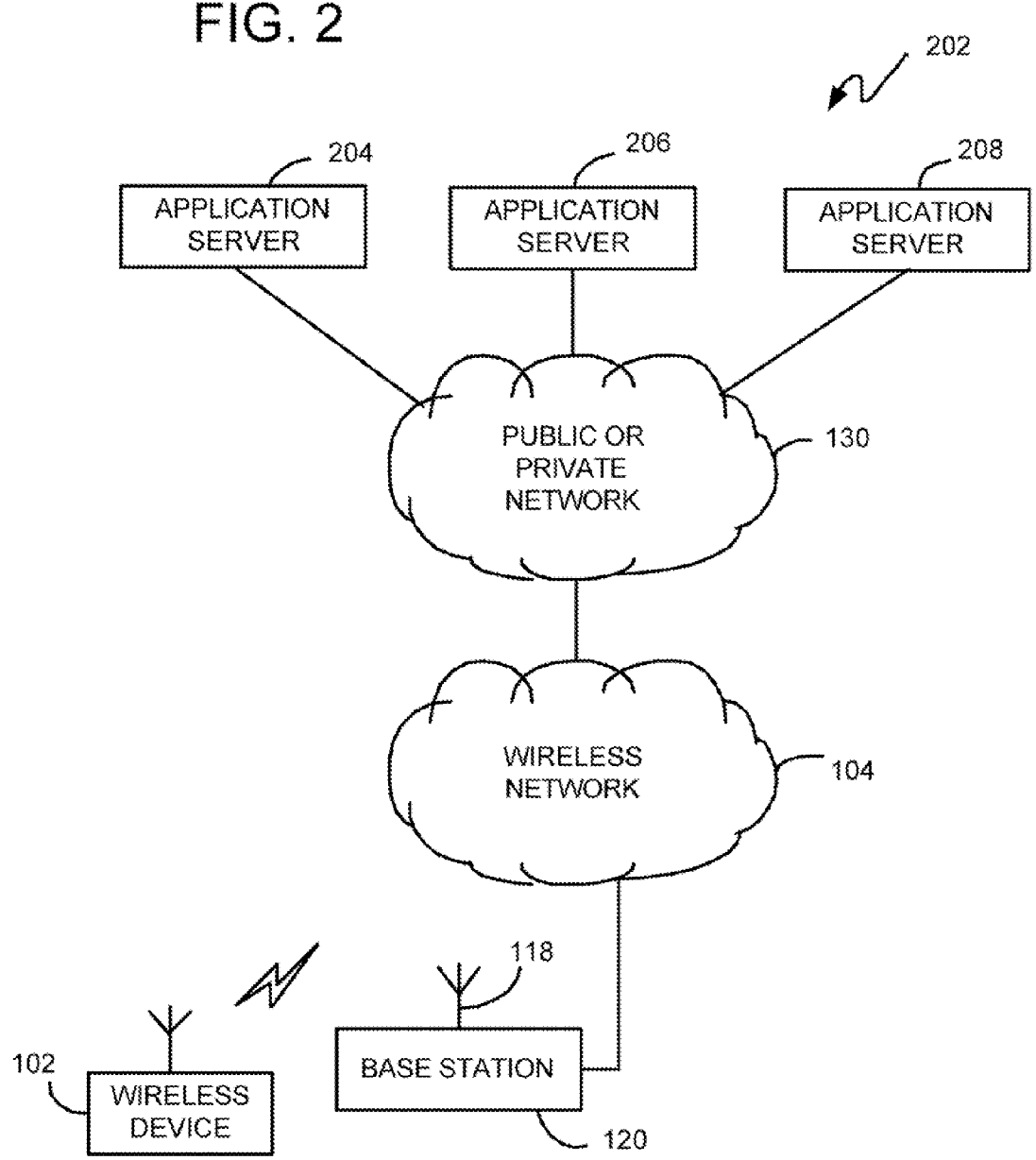
FIG. 2 is an illustration of the wireless communication network having the wireless communication device operating, therein for communicating data between one or more application servers through a public or private communication network.

FIG. 2 is a simplified illustration of wireless network 104 having wireless device 102 operating therein for communicating data between one or more application servers 202 through a public or private communication network 130. Network 130 may be or include Internet, and include a serving network to facilitate the communication of information between application servers 202 and wireless device 102. There are three application servers 202 shown in FIG. 2, namely, application servers 204, 206, and 208; however any suitable number of application servers may be employed in the network. Application servers 202 may provide any suitable voice and/or data service(s) for wireless device 102, especially "push"-based services. More specifically, application servers 202 may provide an electronic mail (e-mail) service, a wireless application protocol (WAP) service, a short messaging service (SMS) service, or an application-specific service such as a weather update service, a horoscope service, and a stock market quotation service, as a few examples.

Figure 3:
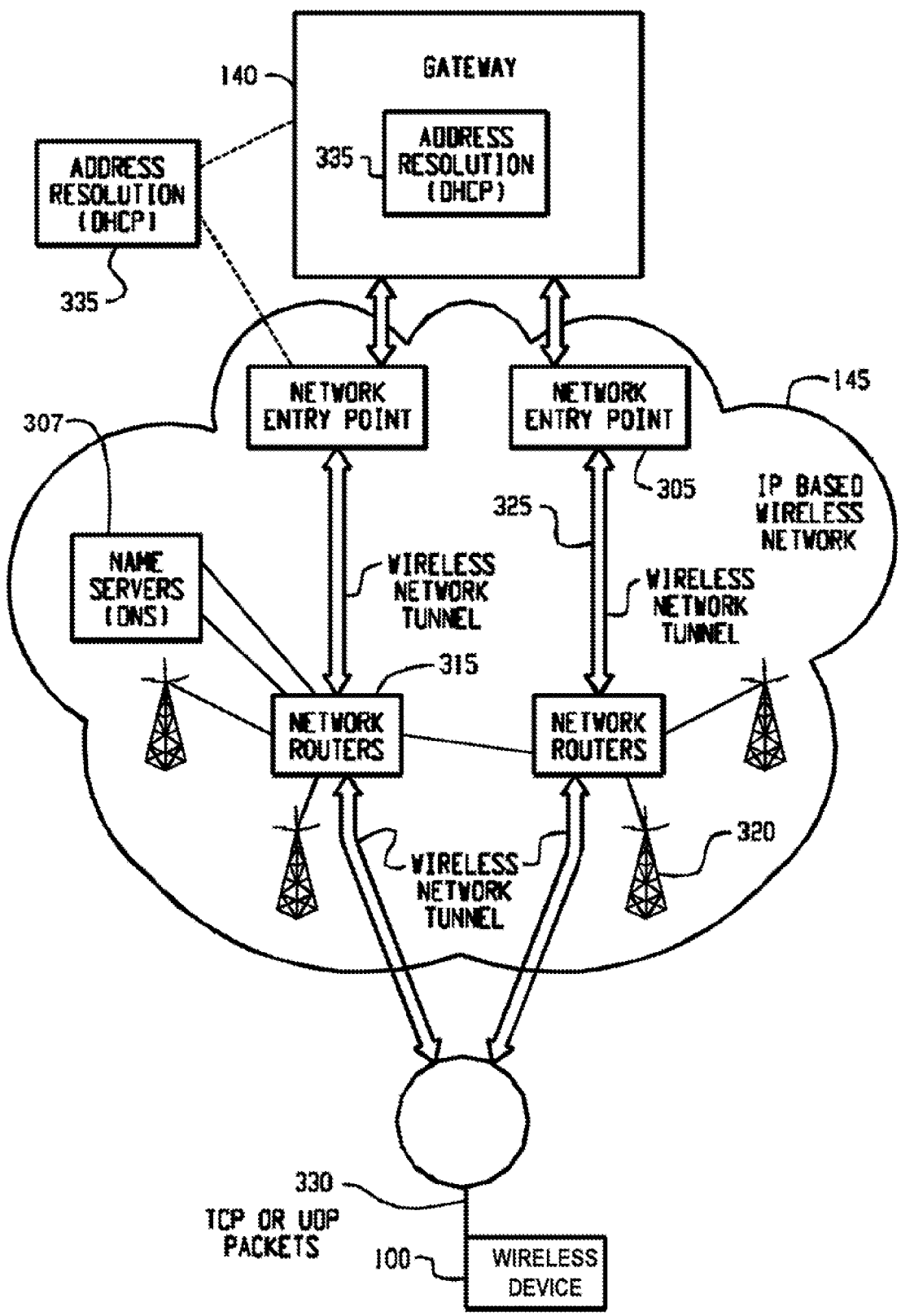
FIG. 3 is a particular structure of a system for communicating with the wireless communication device.

FIG. 3 shows a particular system structure for communicating with a wireless communication device. In particular, FIG. 3 shows basic components of an IP-based wireless data network, such as a GPRS network. A wireless device 100 communicates with a wireless packet data network 145, and may also be capable of communicating with a wireless voice network (not shown). The voice network may be associated with IP-based wireless network 145 similar to, for example, GSM and GPRS networks, or alternatively may be a completely separate network. The GPRS IP-based data network is unique in that it is effectively an overlay on the GSM voice network. As such, GPRS components will either extend existing GSM components, such as base stations 320, or require additional components to be added, such as an advanced Gateway GPRS service Node (GGSN) as a network entry point 305.

As shown in FIG. 3, a gateway 140 may be coupled to an internal or external address resolution component 335 and one or more network entry points 305. Data packets are transmitted from gateway 140, which is source of information to be transmitted to wireless device 100, through network 145 by setting up a wireless network tunnel 325 from gateway 140 to wireless device 100. In order to create this wireless tunnel 325, a unique network address is associated with wireless device 100. In an IP-based wireless network, however, network addresses are typically not permanently assigned to a particular wireless device 100 but instead are dynamically allocated on an as-needed basis. It is thus preferably for wireless device 100 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and wireless devices. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of base stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Base stations 320, as described above, provide wireless links to wireless devices such as wireless device 100.

Wireless network tunnels such as a wireless tunnel 325 are opened across wireless network 345 in order to allocate necessary memory, routing, and address resources to deliver IP packets. In GPRS, such tunnels 325 are established as part of what are referred to as "PDP contexts" (i.e. data sessions). To open wireless tunnel 325, wireless device 100 must use a specific technique associated with wireless network 345. The step of opening such a wireless tunnel 325 may require wireless network 345. The step of opening such a wireless tunnel 325 may require wireless device 100 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one wireless device 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for wireless device 100. When an IP address has been allocated to wireless device 100 and communicated to gateway 140, information can then be forwarded from gateway 140 to wireless device 100.

Wireless tunnel 325 typically has a limited life, depending on wireless device's 100 coverage profile and activity. Wireless network 145 will tear down wireless tunnel 325 after a certain period of inactivity or out-of-coverage period, in order to recapture resources held by this wireless tunnel 325 for other users. The main reason for this is to reclaim the IP address temporarily reserved for wireless device 100 when wireless tunnel 325 was first opened. Once the IP address is lost and wireless tunnel 325 is torn down, gateway 140 loses all ability to initiate IP data packets to wireless device 100, whether over Transmission Control Protocol (TCP) or over User Datagram Protocol (UDP).

In this application, an "IP-based wireless network" (one specific type of wireless communication network) may include but is not limited to: (1) a Code Division Multiple Access (CDMA) network that has been developed and operated by Quakcomm; (2) a General Packet Radio Service (GPRS) network for use in conjunction with Global System for Mobile Communications (GSM) network both developed by standards committee of European Conference of Postal and Telecommunications Administrations (CEPT); and (3) future third-generation (3G) networks like Enhanced Data rates for GSM Evolution (EDGE) and Universal Mobile Telecommunications System (UMTS), GPRS is a data communications overlay on top of CSM wireless network. It is to be understood that although particular IP-based wireless networks have been described, the communication re-establishment schemes of the present application could be utilized in any suitable type of wireless packet data network.

Figure 4:
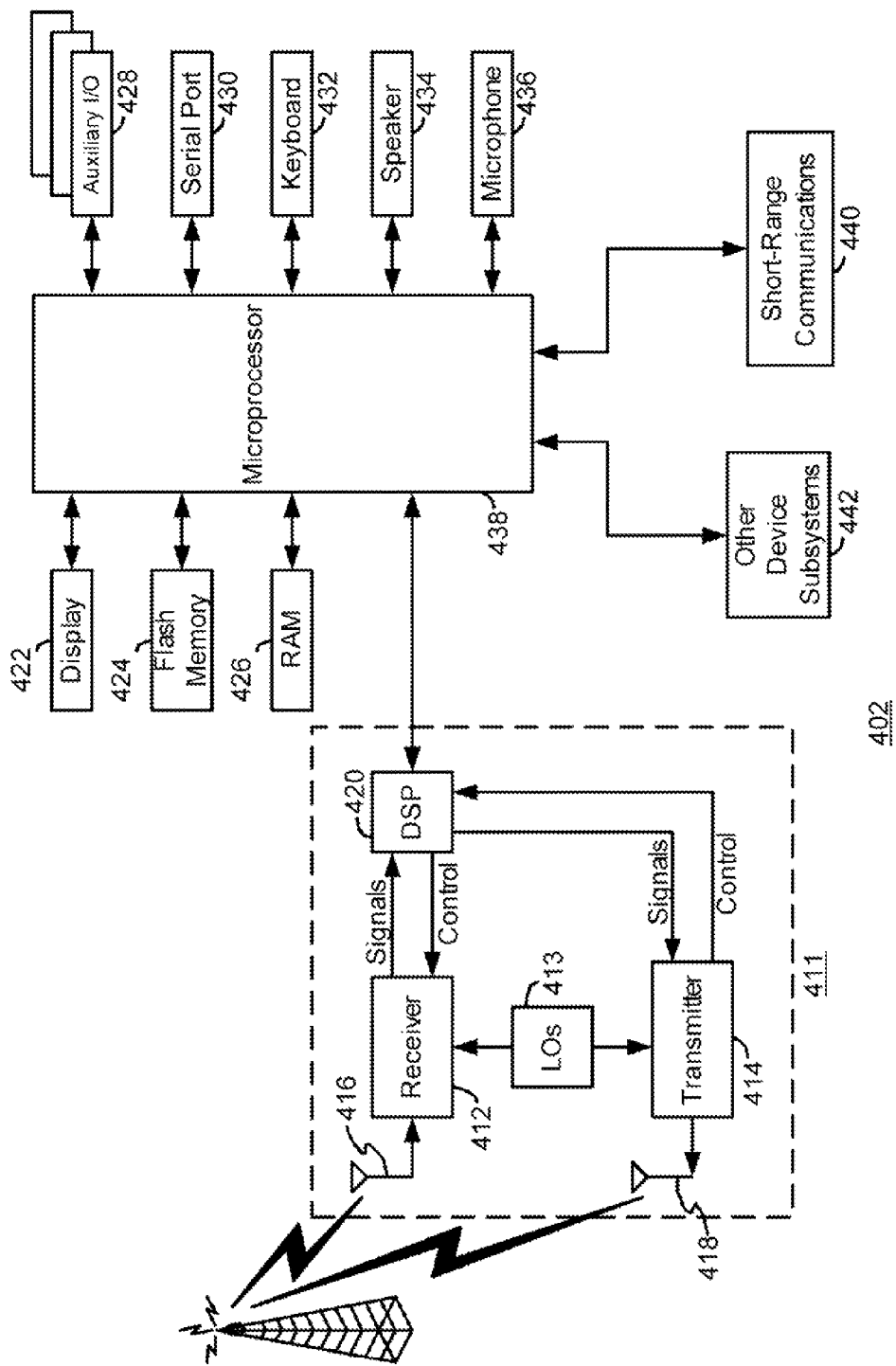
FIG. 4 is a more detailed example of a wireless communication device for use in the wireless communication network.

Preferred Wireless Device. FIG. 4 is a block diagram of a preferred wireless communication device 402 which may be configured to re-establish communication according to the methods described herein. Wireless device 402 is preferably a two-way communication device having at least voice and data communication capabilities, including the capability to communicate with other computer systems on the Internet. Depending on the functionality provided by wireless device 402, it may be referred to as a data messaging device, a two-way pager, a cellular telephone with data messaging capabilities, a wireless Internet appliance, or a data communication device (with or without telephoney capabilities).

If wireless device 402 is established for two-way communication, it will normally incorporate a communication subsystem 411, which includes a receiver 412, a transmitter 414, and associated components, such as one or more (preferably embedded or internal) antenna elements 416 and 418, local oscillators (LOs) 413, and a processing module such as a digital signal processor (DSP) 420. Communication subsystem 411 is analogous to radio modem 108 and antenna 110 shown in FIG. 1. As will be apparent to those skilled in field of communications, particular design of communication subsystem 411 depends on the communication network in which wireless device 402 is intended to operate.

Network access requirements will also vary depending upon type of network utilized. In GPRS networks, for example, network access is associated with a subscriber or user of wireless device 402. A GPRS device therefore requires a Subscriber Identity Module (not shown), commonly referred to as a "SIM" card, in order to operate on the GPRS network. Without a SIM card, a GPRS device will not be fully functional. Local or non-network communication functions (if any) may be operable, but wireless device 610 will be unable to carry out any functions involving communications over the network. In Mobitex and DataTAC networks, on the other hand, such a wireless device 402 is registered on network using a unique identification number associated with each wireless device.

When required network registration or activation procedures have been completed, wireless device 402 may send and receive communication signals over the network. Signals received by antenna 416 through the network are input to receiver 412, which may perform such common receiver functions as signal amplification, frequency down conversion, filtering, channel selection, and like, and in example shown in FIG. 4, analog-to-digital (A/D) conversion. A/D conversion of a received signal allows more complex communication functions such as demodulation and decoding to be performed in DSP 420. In a similar manner, signals to be transmitted are processed, including modulation and encoding, for example, by DSP 420. These DSP-processed signals are input to transmitter 414 for digital-to-analog (D/A) conversion, frequency up conversion, filtering, amplification and transmission over communication network via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Wireless device 402 includes a microprocessor 438, which is one implementation of controller 106 of FIG. 1, which controls overall operation of wireless device 402. Communication functions, including at least data and voice communications, are performed through communication subsystem 411. Microprocessor 408 also interacts with additional device subsystems such as a display 422, a flash memory 424, a random access memory (RAM) 426, auxiliary input/output (I/O) subsystems 428, a serial port 430, a keyboard 432, a speaker 434, a macrophone 436, a short-range communications subsystem 440, and any other device subsystems generally designated at 442. Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list. Operating system software sued by microprocessor 438 is preferably stored in a persistent store such as flash memory 424, which may alternatively be a read-only memory (ROM) or similar storage element (not shown). Those skilled in the art will appreciate that the operating system, specific device applications, or parts thereof, may be temporarily loaded into a volatile store such as RAM 426. It is contemplated that the received communication signals, the detected signal log, and loss of contact log may also be stored to RAM 426.

Microprocessor 438, in addition to its operating system functions, preferably enables execution of software applications on wireless device 402. A predetermined set of applications which control basic device operations, including at least data and voice communication applications (such as a network re-establishment scheme), will normally be installed on wireless device 402 during its manufacture. A preferred application that may be loaded onto wireless device 402 may be a personal information manager (PIM) application having the ability to organize and manage data items relating to user such as, but not limited to, e-mail, calendar events, voice mails, appointments, and task items. Naturally, one or more memory stores are available on wireless device 402 to facilitate storage of PIM data items.

Such PIM application preferably has the ability to send and receive data items via the wireless network. In a preferred embodiment, PIM data items are seamlessly integrated, synchronized, and updated via the wireless network, with the wireless device user's corresponding data times stored and/or associated with a host computer system thereby creating a mirrored host computer on wireless device 402 with respect to such items. This is especially advantageous where the host computer system is the wireless device user's office computer system. Additional applications may also be loaded onto wireless device 402 through network, an auxiliary I/O subsystem 428, serial port 430, short-range communications subsystem 440, or any other suitable subsystem 442, and installed by a user in RAM 426 or preferably a non-volatile store (not shown) for execution by microprocessor 438. Such flexibility in application installation increases the functionality of wireless device 402 and may provide enhanced on-device functions, communication-related functions, or both. For example, secure communication applications may enable electronic commerce functions and other such financial transactions to be performed using wireless device 402.

In a data communication mode, a received signal such as a text message or web page download will be processed by communication subsystem 411 and input to microprocessor 438. Microprocessor 438 will preferably further process the signal for output to display 422 or alternatively to auxiliary I/O device 428. A user of wireless device 402 may also compose data items such as e-mail messages, for example, using keyboard 432 in conjunction with display 422 and possibly auxiliary I/O device 428. Keyboard 432 is preferably a complete alphanumeric keyboard and/or telephone-type keypad. These composed items may be transmitted over a communication network through communication subsystem 411.

For voice communications, the overall operation of wireless device 402 is substantially similar, except that the received signals would be output to speaker 434 and signals for transmission would be generated by microphone 436. Alternative voice or audio I/O subsystems, such as a voice message recording subsystem, may also be implemented on wireless device 402. Although voice or audio signal output is preferably accomplished primarily through speaker 434, display 422 may also be used to provide an indication of the identity of a calling part, duration of a voice call, or other voice call related information, as some examples.

Serial port 430 in FIG. 4 is normally implemented in a personal digital assistant (PDA)-type communication device for which synchronization with a user's desktop computer is a desirable, albeit optional, component. Serial port 430 enables a user to set preferences through an external device or software application and extends the capabilities of wireless device 402 by providing for information or software downloads to wireless device 402 other than through a wireless communication network. The alternate download path may, for example, be used to load an encryption key onto wireless device 402 through a direct and thus reliable and trusted connection to thereby provide secure device communication.

Short-range communications subsystem 440 is an additional optional component which provides for communication between wireless device 402 and different systems or devices, which need not necessarily be similar devices. For example, subsystem 440 may include an infrared device and associated circuits and components or a Bluetooth™ communication module to provide for communication with similarly-enabled systems and devices. Bluetooth™ is a registered trademark of Bluetooth SIG, Inc.

Figure 5:
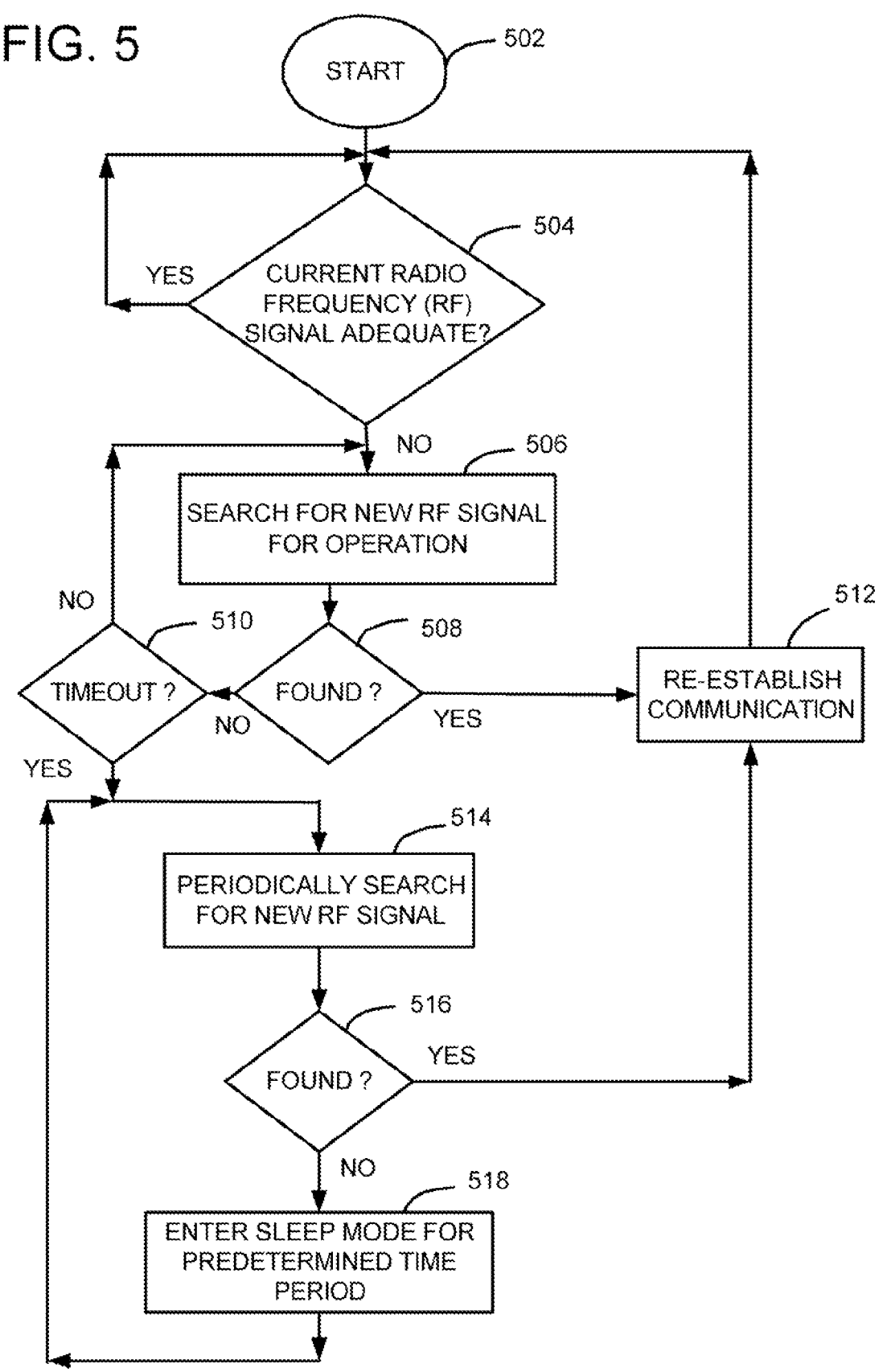
FIG. 5 is a flowchart for describing a method of re-establishing communication for a wireless communication device after a communication loss in a wireless communication network.

FIG. 5 is a flowchart for describing one method of re-establishing communication for a wireless communication device. These methods may be employed in components shown and described above in relation to FIGS. 1-4. FIG. 5 particularly relates to a method employed by a wireless communication device, which is registered with and operating in a wireless communication network and monitoring and receiving radio frequency (RF) signals over a control channel.

Beginning at a start block 502 of FIG. 5, the wireless device tests whether the current RF frequency or channel being monitored is adequate for communication (step 504). This test may be performed, for example, by testing whether a received signal strength indication (RSSI) is above or below a predetermined threshold. If the RSSI is below the predetermined threshold, for example, then the RF frequency or channel is inadequate. If the RF frequency or channel is adequate as tested at step 514, then the wireless device continues to operate normally in the wireless network. If the RF frequency or channel is inadequate as tested at step 504, however, then the wireless device enters a first mode of scanning operation where it searches for a new RF frequency or channel for communication (step 506). IN this first node of scanning operation, the wireless device may scan several different possible RF frequencies or channels to identify an available or "best" signal.

If such a new signal is not immediately found as tested at step 508, then the wireless device continues searching for the new RF frequency or channel at step 506 after testing whether a timeout has occurred at step 510. If a new signal is found when tested at step 508, however, then the wireless device immediately attempts to re-establish communications with the wireless network (step 512). The wireless device may perform step 512 by transmitting a control message which informs the wireless network of the presence of the wireless device. The method then repeats after step 512, beginning at step 504.

The control message transmitted in step 512 may be an update message, which is any message transmitted by a wireless device suitable for use in informing and/or updating the network of the wireless device's status, even if the message may have another different purpose. For example, the update message may be, in GPRS, a location area update message or a routing area update message. As another example, the update message may be a message for sending user data. This message causes wireless network to receive and indication of communication re-establishment between wireless device and wireless network.

If no new signal is found at step 508 before a timeout occurs at step 510, then the wireless device enters a second mode of scanning operation where it again searches for a new RF frequency or channel (step 514). If a new signal is found as tested at step 516, then the wireless device immediately attempts to re-establish communications with the wireless network at step 512 as described above. If a new signal is not immediately found at step 516, however, then the wireless device enters into a sleep mode of operation for a predetermined time period (step 518).

During the sleep mode, the wireless device shuts down significant portions of its circuitry (e.g. its controller and receiver or portions thereof). The predetermined time period of the sleep mode covers a plurality of consecutive receive time periods which the wireless device would otherwise enable its receiver and controller. Once the predetermined time period has expired, the circuitry is re-enabled and the wireless device again searches for the new RF frequency or channel. Thus, the searching in the second mode of operation is periodically performed each time after the wireless device wakes up from a sleep mode of operation.

In an alternative method, a wireless device such as a cellular mobile station operates in a cellular telecommunications network and detects that a signal strength of signals from the cellular telecommunications network is below a predetermined threshold. The cellular mobile station then scans for signals from one or more additional cellular telecommunications networks in response to detecting that the signal strength of the signals is below the predetermined threshold. While signals from one or more additional networks are still inadequate for communication, the cellular mobile station transmits on a regular basis (e.g. periodically) a control message (e.g. an update message) which informs the cellular telecommunications network of the presence of the cellular mobile station. The periodic transmission of such a control message may occur at short intervals, for example, every twenty (20) seconds to every three (3) minutes.

FIGS. 6 and 7 are related flowcharts for describing another method of re-establishing communication for a wireless communication device. These methods may also be employed in components shown and described above in relation to FIGS. 1-4. FIG. 6 particularly relates to a method employed within the fixed network infrastructure, and FIG. 7 particularly relates to an associated method employed by the wireless communication device. To provide an initial context for the method, the wireless communication device is registered with and operating in the wireless communication network. Sometime during operation, however, a loss of communication occurs between the wireless device and the wireless network. For example, the wireless device may be moved to a region where the wireless network can no longer adequately receive wireless signals from the wireless device. A communication loss is defined to encompass any adverse signal, channel, or decoding condition (or combination thereof) which causes communication to be hindered such that information cannot be adequately transferred or received.

Beginning at a start block 602 of FIG. 6, the network receives an indication of the communication loss associated with the wireless device (step 604). In actual practice, the network may receive a number of such indications for a number of different wireless devices associated with such a communication loss. The loss of communication may be determined based on any one of a number of different methods employed between the wireless device and the wireless network. As an example "keep-alive" messages may be periodically sent between the wireless device and the wireless network every predetermined time period, when a communication loss occurs when the network fails to receive a keep-alive message within the predetermined time period, resulting in the network receiving an indication of the communication loss. Preferably, the method employed is a predetermined process which provides some hysteresis, such that short coverage losses such as brief signal fades (e.g. on order of one (1) to ninety (90) seconds) are ignored. Thus, very brief losses of communication (such as those encountered when passing large obstructions, or driving through a tunnel or underground parking garage) need not trigger an indication to the network that a communication loss is being experienced.

When an indication of communication loss for the wireless device is received, however, the network ads an identifier of the wireless device to a list of wireless communication devices associated with communication losses in the wireless network (step 606). The identifier may be any suitable identifier which uniquely identifies the wireless device, such as a Mobile Identification Number (MIN), a Temporary MIN (TMIN), an international Mobile Subscriber identity (IMSI), a Mobile Subscriber (SDN Number (MSISDN), or an Internet Protocol (IP) address, as a few examples.

Communication may also be re-established for some wireless communication devices in the wireless network. In this case, the network receives an indication that communication re-establishment has been made between a wireless device and the wireless network (step 608). For example, if "keep-alive" messages are normally periodically sent between the wireless device and the wireless network every predetermined time period, the network may receive a keep-alive message from the wireless device after failing to receive them for some period of time. Alternatively, the indication may come in the form of a control message or an update message which is transmitted by wireless device, as described above.

When receiving an indication of communication re-establishment, the network removes the identifier of the associated wireless device from the list of wireless devices associated with communication losses (step 610). The network may also, for each wireless device on the list, check to see whether a timer associated with the wireless device has expired (step 612). The timer may be initially set for any suitable amount of time for each wireless device upon its addition to the list; for example a 10-15 minute time may be suitable in some applications. If a timeout occurs for a wireless device, the associated identifier for the wireless device is removed from the list (step 614). Since the wireless device is now available for communication, the network may also check to see whether any messages are pending for this wireless device and cause them to be sent to the wireless device immediately.

Next, the network causes the identifiers of the list to be broadcasted over the wireless network (step 616). The identifiers may be broadcasted over a control channel, for example, of the network. Any suitable control channel and/or control information communication means may be utilized such as, for example, a Broadcast Control Channel (BCCH), a Packet Broadcast Control Channel (PBCCH), System Information message carried over the BCCH and PBCCH, a Periodic Route Area Update procedure, or the use of a Page request and response protocol.

The method of FIG. 6 repeats again starting at step 604, where new indications of communications losses and re-establishments are received and identifiers are added and removed to and form list. Thus, the broadcasting of identifiers on the list occurs on a regular basis, and preferably occurs periodically in the network (e.g. every 90-180 seconds).

Reference will now be made to FIG. 7 for the wireless device method associated with FIG. 6. Beginning at a start block 702 of FIG. 7, a loss of communication occurs between the wireless device and the wireless network (step 704). As described above, a communication loss is defined to encompass any adverse signal, channel, or decoding condition (or combination thereof) which causes communication to be hindered such that information will not be adequately transferred or received. At this point in time, steps 604 and 606 of FIG. 6 are used to add the identifier of this wireless device to a list of wireless devices associated with communication losses.

At some future point in time, however, communication is re-established between the wireless device and the wireless network (step 706 of FIG. 7). In response, the wireless device tunes to a control channel of the wireless network to receive signals and to decode identifiers of the list of unavailable wireless devices broadcasted by the wireless network (step 708). This list is the list of wireless device identifiers associated with communication losses in the wireless network, as broadcasted in step 616 of FIG. 6. For each identifier decoded, a comparison is made between it and an identifier of the wireless device (step 710 of FIG. 7).

If a match occurs between identifiers as tested in step 712, the wireless device transmits a control message which informs the wireless network of the presence of the wireless device (step 714). As described above, the control message may be an update message which is any message transmitted by a wireless device that is used to inform and/or update the network of the wireless device's status, even if the message may have another different purpose. For, example, an update message may be, in GPRS, a Location Update Request message or a Routing Area Update Request message. As another example, an update message may be a message for sending user data. This message causes wireless network to receive an indication of communication re-establishment between the wireless device and the wireless network.

If no match occurs between any of the broadcasted identifiers and the wireless device identifier at step 712, then the wireless device refrains from transmitting the control message to wireless network. The method of FIG. 7 repeats when another loss of communication is experienced between the wireless device and the wireless network.

Advantageously, communication may be re-established between the wireless devices and the wireless network in a controlled manner without overburdening the wireless link, especially with unnecessary traffic. A control message from a wireless device needs not to be normally transmitted unless its identifier is broadcasted by the wireless network. If a wireless device experiences a communication loss and finds that its identifier is not in the list broadcasted by the wireless network, the wireless device is not deemed by the wireless network to be unavailable or lost and thus there is no reason for the wireless device to transmit the control message.

FIGS. 8 and 9 are flowcharts for describing other methods of re-establishing communication for a wireless communication device, which relate to use of one or more application servers for communication with wireless device. These methods may be employed using such devices and networks shown and described above in relation to FIGS. 1-4. FIG. 8 particularly relates to a method employed within a fixed network infrastructure and is referred to in combination with FIG. 2.

To provide an initial context for the method of FIG. 8, a wireless communication device is first registered with and operating in the wireless communication network and communicating data to and/or from at least one application server. Sometime during operation, however, a loss of communication occurs between the wireless device and wireless network. A communication loss is defined to encompass any adverse signal, channel, or decoding condition (or combination thereof) which causes communication to be hindered such that information cannot be adequately transferred or received. For example, the wireless device may be moved to a region where wireless network can no longer adequately receive wireless signals from wireless device. Because of the loss of communication between the wireless device and the wireless network, a loss of the connection and communication between the wireless device and the application server occurs. In actual practice, a number of different wireless devices may be operating in connection with a number of different application servers where, over time, a number of connection and communication losses may occur.

As an illustrative example, wireless device 102 of FIG. 2 may be initially registered with and operating in wireless network 104 and receiving data from application server 204 through a connection (e.g. a TCP/IP connection). In time, a loss in communication occurs between wireless device 102 and wireless network 104, such that the connection between wireless device 102 and application server 204 is broken. Without methods described herein, application server 204 may overburden wireless network 104 with continued connections attempts to wireless device 102 while it is unavailable. Alternatively, application server 204 may not be configured to automatically attempt to re-establish connection with wireless device 102 once communication is re-established between wireless device 102 and wireless network 104.

Beginning at a start block 802 of FIG. 8, a network server maintains storage of a list of identifiers of application servers in association with identifiers of wireless devices between which connections and/or data communications were previously established or pending (step 804). For example, the list may store an identifier of wireless device 102 of FIG. 2 in association with an identifier of application server 204 between which data communications were previously established. This list may be referred to as a "check-in" list. The identifiers used may be any suitable identifiers which uniquely identify the wireless device and the application server. The identifier for the wireless device may be, as some examples, a Mobile Identification Number (MIN), a Temporary MIN (TMIN), and International Mobile Subscriber Identity (IMSI), a Mobile Subscriber (SDN Number (MSISDN), or an Internet Protocol (IP) address; the identifier for application server may be, for example, an application server name. Each association of identifiers may be entered or added to the list sometime during the establishment or maintenance of connection between the wireless device and the application server. Alternatively, each association may be entered or added to the list only when or after the connection or the data communication between the wireless device and the application server is severed or communication is broken.

Once communication is re-established between the wireless device and the wireless network, the stored identifier of the application server associated with the wireless device is used to re-establish the connection and the data communication between the application server and the wireless device (step 806). For example, the network server may be a contacting server which uses the application server identifier to contact the application server so that it can re-establish the connection and data communication. As another example, a separate contacting server may request and receive the application server identity by querying the network server using the identifier of the wireless device, where the contacting server thereafter contacts the application server so that it can re-establish the connection and data communication. As illustrated in FIG. 8, the method is repeated continually so that multiple wireless devices can be served in the same manner. Preferably, the method of FIG. 8 and the stored list is kept in a presence server, such as a presence server 134 of FIG. 1 which may be communicatively connected in the network as shown.

FIG. 9 is a flowchart which describes the method of FIG. 8 in a preferred, more detailed, embodiment. Beginning at a start block 902, an indication of a communication loss between a wireless device and a wireless network is received (step 904). In response to the communication loss, an identifier of the application server is stored in a list in association with an identifier of the wireless device between which connections and/or data communications were established or pending (step 906). If an indication of communication re-establishment between the wireless device and the wireless network is received (step 908), the identifier of the application server is used to re-establish the connection and the data communication between the application server and the wireless device (step 910). For example, the application server is contacted using the application server identity (e.g. application server name) so that the application server may re-establish the connection with wireless device. The identifiers for the application server and the wireless device are then removed from the stored list (step 912). The method repeats continually beginning again at step 904. Although the method of FIG. 9 is described above for a single wireless device in the network, in actual practice the method is performed in connection with a plurality of wireless devices and a plurality of application servers in the network. Preferably, the method of FIG. 9 and the stored list is kept in a presence server, such as presence server 134 of FIG. 1 which may be communicatively connected in the network as shown.

Advantageously, the methods described in relation to FIGS. 8 and 9 provide an automatic re-establishment of communication for a wireless device without overburdening a wireless network with a large number of continued connections attempts from application servers.

FIG. 10 is yet another method of re-establishing communication for a wireless communication device with one or more application servers. This method may be employed in systems shown and described above in relation to FIGS. 1-4. FIG. 10 more particularly relates to a method employed within a fixed network infrastructure and is referred to in combination with FIG. 2.

To provide an initial context for the method of FIG. 10, a wireless communication device is first registered with and operating in the wireless communication network and communicating data to and/or from at least one application server. Sometime during operation, however, a loss of communication occurs between the wireless device and the wireless network. A communication loss is defined to encompass any adverse signal, channel, or decoding condition (or combination thereof) which causes communication to be hindered such that information cannot be adequately transferred or received. For example, the wireless device may be moved to a region where the wireless network can no longer adequately receive wireless signals from the wireless device. Because of the loss of communication between the wireless device and the wireless network, a connection and/or communication loss between the wireless device and the application server occurs. In actual practice, a number of different wireless devices may be operating in connection with a number of different application servers where, over time, a number of connection or communication losses may occur.

As an illustrative example, wireless device 102 of FIG. 2 may be initially registered with and operating in wireless network 104 and receiving data from application server 204 through a connection (e.g., a TCP/IP connection). In time, a loss in communication occurs between wireless device 102 and wireless network 104, such that the connection between wireless device 102 and applications server 204 is broken. Without the methods described herein, application server 204 may overburden wireless network 104 with a large number of continued connections attempts to wireless device 102 while it is unavailable or, alternatively, application server 204 may not be configured to automatically re-establish the connection with wireless device 102 after communication is re-established between wireless device 102 and wireless network 104.

Beginning at a start block 1002 of FIG. 10, a server receives a plurality of connection requests to the wireless device from the application server over some period of time after the communication loss between the wireless device and the wireless network (step 1004). The server receives these connection requests, but limits a number or a rate of the requests to pass during the communication loss between the wireless device and the wireless network (step 1006). The server may utilize, for example, a rate limiting technique or traffic policing technique to achieve thus. The method is completed starting again at step 1004, but is repeated for additional communication loses for the wireless device as well as for multiple wireless devices.

Rate limiting and traffic policing techniques are presently used to manage the volume and rate at which traffic enters a core transport network of a service provider. As apparent in the present application of FIG. 10, these techniques are used to manage the volume and/or rate at which connection requests from application servers enter into a network which facilitates data communication between the application server and the wireless devices. This is especially advantageous when performed during the time that a communication loss exists between the wireless device and the wireless network.

In the block diagram of FIG. 11, several device components from FIG. 2 are shown including application servers 202, wireless device 102, and base station 120. Also shown in FIG. 11 is a server 1102 which limits the number and/or the rate of connection requests from application servers 202 allowed to pass through the wireless network. Server 1102 receives such connection requests through a router 1104. The connection request limiting techniques are performed at least during the time that a communication loss exists between wireless device 102 and a wireless communication network which includes base station 102.

In one embodiment, server 1102 is part of an SGSN of the wireless network. Alternatively, server 1102 may be part of a GGSN of the wireless network. In even another embodiment, server 1102 may be part of both the SGSN and the GCSN of the wireless network.

To perform these techniques, server 1102 includes at least a queue 1106 and a regulating component 1108. In one embodiment, server 1102 may perform a traffic shaping technique which reduces the potential for network congestion by placing connection requests in queue 1106 with a "shaper" (i.e. regulating component 1108) at the head of queue 1106. Such a technique smoothes out connection request flows and regulates the rate and volume of requests that are admitted to the network. There are at least two fundamental traffic-shaping, rate-limiting techniques which may be utilized: (1) a traffic-smoothing technique; and (2) a long-term average traffic rate-shaping technique.

A traffic-smoothing technique eliminates bursts and presents a steady stream of requests to the network and is commonly implemented using what is referred to as a "leaky bucket" algorithm. In this case, regulating component 1108 may be referred to as a leaky bucket queue regulator. A long-term average traffic rate-shaping technique permits bursts of a predetermined size and presents a burst-regulated stream of requests to the network and is commonly implemented using what is referred to as a "token bucket" algorithm. In this case, regulating component 1108 may be referred to as a token buck queue regulator.

Server 1102 may alternatively perform a traffic policing technique, which allows connection requests to be examined and discarded or marked if they exceed predetermined limits. A traffic policing function uses the token bucket algorithm as described above, where queue 1106 is replaced with a connection request discard/marking function. If the policing function determines that a particular request is within the predetermined limit, then the request is admitted to the network. If the policing function determines that the request is outside the predetermined limit, then the request is either dropped immediately ("hard" policing) or admitted to the network but marked as outside the predetermined limits ("soft" policing).

Although any suitable means may help to provide the techniques of FIGS. 10-11, the techniques are preferably performed in connection with Access Point Name (APN) information in the network. An APN is an identifier which identifies an access point in an external network and may be used for billing purposes. More particularly, the APN is used to inform an SCSN which GGSN to use and to inform the GGSN which external data network to use. A typical APN includes two parts (1) and APN Network Identifier; and (2) an APN Operator Identifier. The APN Network Identifier identifies the external network being accessed (e.g. the equivalent to a domain name on the Internet). The APN Operator Identifier is optional and identities the network used in roaming. A subscriber can have an APN set in the HLR or request a particular APN when activating a PDP context.

According to the present technique, an APN (or associated) field may be used to convey the limitation on the number or the rate of connection requests from an application server for each subscriber. In this case, the server uses the APN (or associated) field to extract the connection request limitations for the subscriber and accordingly execute the technique. Advantageously, the methods and apparatus described in relation to FIGS. 10-11 provide a re-establishment of communication for a wireless device without overburdening the wireless network with a large number of continued connections attempts from application servers.

Final Comments. Thus, several related methods and apparatus for re-establishing communication for a wireless communication device after a communication loss between the wireless device and a wireless communication network have been disclosed. In one technique, a method involves the acts of receiving an indication of the communication loss between the wireless device and the wireless network; based on receiving the indication of the communication loss, adding an identifier of the wireless device to a list of unavailable wireless devices in the wireless network; and causing identifiers of the list to be broadcasted in the wireless network. In the wireless device, the method involves the acts of decoding broadcasted identifiers of a list of unavailable wireless communication devices in the wireless network after the communication loss; comparing each broadcasted identifier with an identifier of the wireless device; and based on a match between a broadcasted identifier and the identifier of the wireless device, transmitting a control message which informs the wireless network of the presence of the wireless device. Otherwise, the wireless device normally refrains from transmitting the control message to the wireless network.

In another technique, a method re-establishing a connection between an application server and a wireless communication device operating in a wireless communication network includes the acts of storing an identifier of the application server in association with an identifier of the wireless device; receiving an indication of a communication loss between the wireless device and the wireless network; receiving an indication that communication is re-established between the wireless device and the wireless network; and providing the stored association of identifiers of the application server and the wireless device to assist in re-establishing a connection between the wireless device and the application server. The identifier of the application server may be used to contact the application server to assist in re-establishing the connection. This method may be executed by a server which includes a data storage medium, computer instructions stored on the data storage medium; and a computer processor which executes the computer instructions for: starting identifiers of application servers in association with identifiers of wireless communication devices between which data communications were established or pending; and providing an identifier of an application server to assist in re-establishing a connection between the application server and a wireless communication device after communication is re-established between the wireless device and a wireless communication network.

In yet another technique, a method to facilitate a re-establishing of communication between a wireless communication device and an application server includes the acts of receiving a plurality of connection requests from the application server to the wireless device after a communication losses between the wireless device and a wireless communication network; and limiting a number or a rate of the connection requests from the application server during the communication loss between the wireless device and the wireless network. The number or rate of the connection requests may be limited with use of, for example, a rate limiting technique or a traffic policing technique. A server may be used to facilitate the re-establishing of communication and include a data storage medium; computer instructions stored on the data storage medium; and a computer processor which executes the computer instructions for: receiving a plurality of connection requests from the application server after a communication loss between the wireless device and a wireless communication network; and limiting a number or a rate of the connection requests from the application server during communication loss between the wireless device and the wireless network.

In yet even another technique, a method of re-establishing communication includes the acts of operating a wireless communication device in a cellular telecommunications network; detecting that a signal strength of signals from the cellular telecommunications network is below a predetermined threshold; based on detecting that the signal strength of the signals is below the predetermined threshold, scanning for signals from one or more additional cellular telecommunications networks; and while signals from one or more additional cellular telecommunications networks are inadequate for communication, transmitting on a regular basis a control message which informs the cellular telecommunications network of the presence of the cellular mobile station. A cellular mobile station may include a receiver; a transmitter; and antenna coupled to the receiver and the transmitter; one or more processors coupled to the receiver and the transmitter; the one or more processors being operative to detect that a signal strength of signals from a cellular telecommunications network is below a predetermined threshold; the one or more processors being further operative to, based on detecting that the signal strength is below the predetermined threshold, scan for signals from one or more additional cellular telecommunications networks; and the one or more processors being further operative to, while signals from one or more additional cellular telecommunications networks are inadequate for communication, cause a control message which informs the cellular telecommunications network of the presence of the cellular mobile station to be transmitted through the transmitter on a regular basis.

In finally another technique, a method of operating to re-establish communication between the wireless device and a wireless communication network comprising the acts of: receiving radio frequency (RF) signals from a wireless communication network during communication therewith; detecting that a signal strength of the RF signals is no longer adequate for communication; scanning to identify a new RF signal for communication; if a new RF signal is not identified by the act of scanning, periodically scanning to identify a new RF signal for communication; and if a new RF signal is identified, transmitting a control message to re-establish communication. A wireless communication device may include a receiver which receives radio frequency (RF) signals from a wireless communication network during wireless communication therewith; a signal strength detector which detects a signal strength of the RF signals; a transmitter; one or more processors coupled to the receiver and the transmitter; the one or more processor being operative to: determine that the RF signals are no longer adequate for communication based on the signal strength detector; cause the wireless device to enter into a first mode of scanning to identify a new RF signal for communication; cause the wireless device to enter into a second mode of periodic scanning to identify a new RF signal for communication, if a new RF signal is not identified in the first mode of scanning; and cause the transmitter to transmit a control message to re-establish communications if a new RF signal is identified.

The above-described embodiments of invention are intended to be examples only. Alterations, modifications, and variations may be effected to particular embodiments by those of skill in art without departing from scope of invention, which is defined solely by claims appended hereto.

What is claimed is:

1. A method for use in re-establishing a data connection between an application server and a wireless communication device operating in a wireless communication network, the method comprising the acts of:

storing an identifier used to contact the application server in association with an identifier used to contact the wireless communication device;

receiving an indication of an out-of-coverage condition between the wireless communication device and the wireless communication network which causes the data connection to be terminated;

after the out-of-coverage condition, receiving an indication that the wireless communication device has regained signal coverage with the wireless communication network; and in response to receiving the indication that the wireless communication device has regained signal coverage, using or providing, from the stored association, the identification of the application server for contacting the application server to re-establish the data connection with the wireless communication device.

2. The method of claim 1, wherein the act of storing the identifier is performed in response to the act of receiving the indication of the out of coverage condition.

3. The method of claim 1, wherein the act of storing the identifier is performed prior to the act of receiving the indication of the out of coverage condition.

4. The method of claim 1, wherein the act of storing the identifier used to contact the application server comprises the further act of storing an application server name of the application server.

5. The method of claim 1, comprising the further act of:
using the identifier of the application server, contacting the application server to cause the connection to be re-established.

6. A method for use in re-establishing data communication over a data connection between an application server and a wireless communication device after an out of coverage condition between the wireless communication device and a wireless communication network which causes the data connection to be terminated, the method comprising the acts of:
storing an identifier used to contact the application server in association with an identifier used to contact the wireless communication device; and
after the out of coverage condition, in response to identifying that the wireless communication device regains signal coverage with the wireless communication network:
using or providing, from the stored association, the identifier of the application server for contacting the application server to re-establish the data connection with the wireless communication device.

7. The method of claim 6, comprising the further act of:
using the identifier of the application server to contact the application server to assist in re-establishing the connection.

8. The method of claim 6, wherein the identifier used to contact the application server comprises an application server name.

9. A server, comprising:
a data storage medium;
computer instructions stored on the data storage medium;
a computer processor which executes the computer instructions for use in re-establishing data communication over a data connection between an application server and a wireless communication device after an out of coverage condition between the wireless communication device and a wireless communication network which causes the data connection to be terminated, by performing the following acts of:
storing an identifier used to contact the application server in association with an identifier used to contact the wireless communication device; and
after the out of coverage condition, in response to identifying that the wireless communication device regains signal coverage with the wireless communication network:
using or providing, from the stored association, the identifier of the application server for contacting the application server to re-establish the data connection with the wireless communication device.

10. The server of claim 9, wherein the computer processor which executes the computer instructions for using or providing the identifier is used for contacting the application server to re-establish the connection between the application server and the wireless communication device.

11. The server of claim 9, which is a presence server.

12. The method of claim 1, wherein the act of using or providing comprises the further act of:
providing the identifier of the application server to a contacting server which contacts the application server using the identifier.

13. The method of claim 1, which is performed by a presence server and the act of using or providing comprises the further act of:
providing the identifier of the application server to a contacting server based on the identifier of the wireless communication device.

* * * * *